United States Patent [19]

Reilly

[11] 4,156,207
[45] May 22, 1979

[54] WALL DOMINATED LASER DISCHARGE USING TURBULENT AMBIPOLAR DIFFUSION

[75] Inventor: James P. Reilly, Lexington, Mass.

[73] Assignee: Avco Everett Research Laboratory, Inc., Everett, Mass.

[21] Appl. No.: 803,357

[22] Filed: Jun. 3, 1977

Related U.S. Application Data

[63] Continuation-in-part of Ser. No. 697,591, Jun. 18, 1976, abandoned, which is a continuation-in-part of Ser. No. 522,836, Nov. 11, 1974, abandoned.

[51] Int. Cl.² .................................................. H01S 3/02
[52] U.S. Cl. ............................................... 331/94.5 D
[58] Field of Search .................. 331/94.5 G, 94.5 C, 331/94.5 D

[56] References Cited

U.S. PATENT DOCUMENTS

| | | | |
|---|---|---|---|
| 3,633,125 | 1/1972 | Whitehouse | 331/94.5 G |
| 3,758,874 | 9/1973 | Hoag | 331/94.5 |
| 3,863,103 | 1/1975 | Eckbreth et al. | 331/94.5 G |
| 3,936,771 | 2/1976 | Kallis | 331/94.5 C |
| 3,970,962 | 7/1976 | Peressini et al. | 331/94.5 G |

OTHER PUBLICATIONS

Reilly, J. P., *Journal of Applied Physics*, vol. 43, No. 8, Aug. 1972, pp. 3411–3416.

*Primary Examiner*—William L. Sikes
*Assistant Examiner*—Marcus S. Rasco
*Attorney, Agent, or Firm*—Irwin P. Garfinkle; Robert J. McNair

[57] ABSTRACT

An electric discharge gas laser has a turbulence generator inserted in the flow path of the gas upstream of the optical cavity. The turbulence generator is illustrated as a screen. The turbulence is also disclosed as resulting from a vortex-causing blade inserted in the gas conduit. The turbulence resulting in the gas flow provides energy and specie diffusion to the outer walls at a rate relatively faster than laminar (molecular) diffusion, thereby permitting stable operations of the diffuse electric discharge at relatively higher powers.

6 Claims, 3 Drawing Figures

WALL DOMINATED LASER DISCHARGE USING TURBULENT AMBIPOLAR DIFFUSION

BACKGROUND OF THE INVENTION

This is a continuation-in-part of U.S. application, Ser. No. 697,591 filed June 18, 1976 now abandoned which was a continuation-in-part of U.S. patent application, Ser. No. 522,836 filed Nov. 11, 1974 now abandoned.

This invention relates to lasers which employ a gas mixture as the laser medium. A gas laser is a device in which the gaseous active medium is capable of stimulated emission of coherent radiation when pumped to produce a population inversion between a given energy level and a lower energy level. In a laser oscillator the overall gain (population inversion) must exceed the losses, including the fractional power output. To achieve oscillation, it is usually necessary to enclose the active medium in an optical resonator (a laser cavity), from which a portion of the coherent radiation can be extracted. Typically, the laser cavity may consist of a tube filled with a combination of two or more gases such as carbon dioxide and nitrogen, and energetic electrons are provided in the cavity containing the gas mixture by optical pumping, electron impact, excitation transfer in non-elastic atom-atom collisions, by molecular disassociation in atom-molecule collisions or by the pumping of gaseous atoms by electron impact. The energetic electrons so provided collide with the gas molecules and excite them to higher energy states. If the excited molecules decay to the ground state by stimulated emission, then quanta of light energy are emitted in phase with the stimulating photons and lasing action occurs.

Unfortunately, the electric discharge process is not 100 percent efficient, and an appreciable amount of the energy that goes into exciting the gas molecules is not recovered as radiated light quanta. The waste energy eventually appears as heat, and localized heating can bring about further unwanted ionization of the atoms making up the gas molecules. Production of an excess of ion-electron pairs can impair further lasing action of the gas, for example, if a strong arc forms. It is known that the situation can be improved if the heat and/or excess of ion-electron pairs can be dissipated rapidly to the walls of the cavity. In the prior art, as exemplified by U.S. Pat. No. 3,863,103 to Eckbreth, et al, this is accomplished by molecular diffusion of both the excess heat and the excess of ion-electron pairs to the confining walls. In the U.S. Pat. No. 3,758,874 to Hoag convective cooling is achieved by the use of corona discharge from sharp points in the excited region. On the other hand, we intentionally introduce turbulence into the flow of gas within the lasing cavity to bring about faster diffusion of the waste heat and excess ionization to the confining walls. As contrasted with the prior art, use of turbulent ambipolar diffusion permits a higher operating power to be extracted from a given size laser instrument.

It must be noted here that the laser application described here is only one such application of the turbulence-stabilized CW electric discharge. Providing a means whereby a flowing CW electric discharge can operate as a stable, diffuse (non-constricted) discharge at higher powers is interesting for a number of chemical processing applications. One such further example is in the production of Ozone. Another might be the production of CO and $O_2$ from $CO_2$.

As pointed out by Davis and Brown in AIAA Paper No. 72-722 published at the AIAA Fifth Fluid and Plasma Dynamics Conference in Boston, Mass., June 26–28, 1972, significant improvements in the performance of closed-cycle discharges have been effected through the use of aerodynamic techniques. These investigators report that where gross velocity defects are induced in the flow field surrounding the cathodes, the local gas temperature rises above that of the surrounding region and the local density decreases, thereby limiting output power. David and Brown proposed to compensate for the velocity defects by means of flow conditioners mounted upstream of the cathode elements, and they report improved stability, permitting an increased power output from the laser.

The present invention is an improvement over the Davis and Brown system in that a turbulence generator is used to provide both energy and specie diffusion throughout the entire volume without affecting the gross features of the main flow velocity field thereby permitting improved operating stability at relatively high powers. In addition, the use of uniform, smallscale turbulence has a smaller effect on the optical homogeneity of the gaseous laser medium than large-scale flow turbulence and velocity non-uniformities.

THEORY

It is known that in a standard DC electric discharge, the ion-electron pairs must be diffused to the confining wall at a rate sufficient to provide stabilized operation, i.e., avoid arcing. This invention teaches the use of turbulent ambipolar diffusion in relatively high powered CW lasers in lieu of the prior art molecular ambipolar diffusion.

Self-sustaining ambipolar diffusion-dominated laser discharges are defined as those discharges which are stabilized by diffusion of ion-electron pairs to the edges (i.e., confining walls) of the discharge. This type of discharge is typical of the long-tube/slow-flow $N_2/CO_2$ lasers. Assuming the ion-neutral diffusion coefficient for $CO^+$ through CO is typical for $N_2^+$ through $N_2$ and $O_2^+$ through $O_2$ (i.e., on the order of 30 cm$^2$/sec at 1 torr and 300° K.), one can write the approximate equation for diffusion time as $$\tau_{amb} \cong \frac{1}{2} \frac{(H/2)^2}{\phi_{amb}}$$

where $$\phi_{amb} \cong 0.03 \frac{cm^2}{sec} \frac{1}{<n>} \left( \frac{T_{gas}}{300° K.} \right) \left[ \frac{T_e}{T_{gas}} + 1 \right]$$

H is channel height
$<n>$ is gas density in multiples of that at N.T.P.
$T_{gas}$ is gas temperature
$T_e$ is electron temperature
And since $T_e$ is $\approx 1$ ev, and $T_{gas}$ is about 300° K.

$$\phi_{amb} \cong \frac{1.2}{<n>} \frac{cm^2}{sec}$$

and therefore $$\tau_{amb} \cong \frac{1}{8} H^2 <n> sec$$

Writing now an equation for the power out of a volume XHL having a flow time $\tau_F$, and assuming a typical molecular laser output of 50 J/L-atom we get:

$$P = \frac{50J}{1000 \text{ cc-atm}} <n> \frac{XHL}{\tau_f} \text{ watts}$$

substituting our relation for ambipolar diffusion time, this becomes $$P \cong 0.4 \frac{\tau_{amb}}{\tau_f} L \left(\frac{X}{H}\right)$$

Since the ambipolar diffusion rate to the channel boundaries should be at least as fast as the convective loss in order to have an ambipolar diffusion-dominated plasma, one must have $$\tau_{amb} \leq \tau_f.$$

Hence, a laser device which is ambipolar stabilized with a square cross section (X=H) will have a power output on the order of 50 watts per meter of length L within a factor of about 2, depending on the actual overall energy densities measured using such electron density profiles. Note that this technique of discharge stabilization favors geometries longer in the flow direction (X) than they are high (H). In short, the molecular ambipolar-stabilized discharge for this application is not readily scalable to a high-power efficient device, although operation in the order of 50 watts (2-pass) to 500 watts (folded) per meter of length might be possible.

In lieu of molecular ambipolar diffusion, this invention teaches the use of fast moving, turbulent eddies over substantially the entire front of the flowing gases as in a turbulent boundary layer or turbulent pipe flow. As is known, at high Reynolds Numbers the rate of momentum transport from the center of flow passages to the walls (that is, wall shear) can be much greater for turbulent flows than for laminar (molecular transport) flows. Hence, the transport times by the turbulent convection cells can be faster than that by molecular diffusion. The analysis below is a simple but reasonably accurate estimate for the turbulent convection time-scales.

In an equation describing the transport of momentum, the characteristic time for viscous diffusion can be extracted as $$\tau_{visc} \cong \frac{\rho}{\mu} \delta_v^2$$

where $\tau_{visc}$ is the characteristic viscous transport time, $\rho$ the gas mass density, $\mu$ the apparent viscosity coefficient and $\delta_v$ the length of the velocity gradient-scale (i.e., boundary layer thickness, etc.).

The shear stress at a wall in either turbulent or laminar flows is given by $$f_{shear} = C_f \tfrac{1}{2} \rho U^2$$

where $C_f$ is a shear coefficient and U is the gas velocity. The shear coefficient is a function of flow Reynolds number for both laminar and turbulent flows. Defining the shear force as the loss of main flow momentum over a boundary layer thickness $\delta_v$ at a rate $(1/\tau_v)$, i.e., $f_{shear} = \rho U \delta_v / \tau_v$, we obtain $$\tau_{visc} \cong \frac{\delta_v}{U C_f}$$

For fully developed laminar (molecular transport) flows, $\delta_v$ is approximately $\tfrac{1}{2}$ the channel height H, and $C_f$ is given by $$\text{lam: } C_f \cong \frac{3}{2} \frac{\mu}{\rho U H} = \frac{3/2}{R_E(H)}$$

Hence, for laminar (molecular transport) flows $\tau_v \leq \rho/\mu$ $H^2$ as is obtained above from an analysis of the laminar flow Equations and in direct comparison with that obtained above in the discussion of ambipolar diffusion. $(\tau_{Amb} \sim \rho H^2)$ For fully developed turbulent flows, however, it is well known that the shear coefficient is not as strongly dependent on Reynolds number as is laminar flow, $$\text{turb: } C_f \cong \frac{0.03}{(R_E(H))^{0.2}}$$

The reason for this rather weak dependence on the gross features of the turbulent flow is that the wall transport has a "bottleneck" at the laminar sublayer, the region in the flow immediately adjacent to the wall which is dominated by molecular transport. The turbulent overlayer feeds this thin region momentum by eddy transport, and this thin region then uses molecular transport to complete the transfer of momentum to the wall. For a further discussion of the nature of the turbulent boundary layer see S. S. Kutateladze and A. I. Leont'ev, "Turbulent Boundary Layers in Compressible Gases," published by Academic Press, 1964.

In turbulent flows, the scale for viscous diffusion is therefore that of the laminar sublayer which is characterized by a Reynolds number on the order of 130. Combining these concepts, the time-scale for turbulent diffusion becomes $$\tau_t = \frac{\delta_v}{U C_f} \cong \left(\frac{130\mu}{\rho U^2}\right) \frac{1}{.03} \left(\frac{\mu}{\rho U H}\right)^{0.2}$$

which shows that the transport time from the sublayer edge to the wall is weakly dependent on channel height but strongly dependent on gas density and velocity. Ignoring, for the moment, the weak variation of turbulent shear coefficient $C_f$ with Reynolds No. the characteristic turbulent diffusion time becomes of the order of $$\tau_t \cong \frac{130\mu}{\rho U^2} \frac{1}{.003} = \frac{5 \times 10^{-6}}{<n> M^2} \text{ sec}$$

where M is the (subsonic) Mach Number, and $<n>$ is the gas density relative to atmospheric.

The two characteristic times for flow $(\tau_f)$ and turbulent diffusion $(\tau_t)$ are plotted in FIG. 3 and indicate the complexity of the problem. As an example, the CW laser device constructed by Hill (see A. E. Hill, "Roll of Thermo Effects and Fast Flow Power Scaling Techniques in $CO_2$-$N_2$-He Lasers," Appl. Phys. Letters 16, No. 11, pp. 423–426 (June 1970)) has a flow length of 1 meter and operates at a Mach number of about 0.5, giving a flow time of about 5 milliseconds. The gas density is approximately 1/10 atm of a mixture approximately 80% Helium, giving a turbulent diffusion time on the order of 500 $\mu$ sec. Hence, the turbulent diffusion time is on the order of 1/10 the flow time, indicating fully-developed turbulent pipe flow in the channel after about 1/10 of the flow length, that is, good communication from channel center to the walls. Hence, this analysis indicates that Hill's reported laser discharge was turbulence-stabilized.

This technique of discharge stabilization, as well as that for ambipolar diffusion, favors discharges of rectangular cross section, longer in the flow direction than they are high so as to allow transport of species and excess energy concentrations to the walls of the cavity in a time comparable to or shorter than a flow transit time through the cavity.

Writing the equation for the power out of a volume of XHL having a flow time $\tau_f$ $$P = \frac{50J}{1000 \text{ cc-atm}} <n> \frac{XHL}{\tau_f} \text{ watts}$$

Substituting into this the turbulent diffusion time-scale, one obtains $$P = 400 \frac{\tau_f}{\tau_t} \frac{L}{X/H}$$

Using the characteristics of the Hill CW $CO_2$ turbulent-flow laser in the above equation, one obtains an estimated 20 kW output per meter of length, which is about that measured from the device.

Combining the last equation with that for the flow time $\tau_f$ and the turbulent diffusion time $\tau_t$ we obtain an expression for the power achievable out of such a device (assuming $\tau_t/\tau_f \leq 1/10$)

$$P \geq 4 \times 10^3 \frac{L}{X/H} \quad \text{Watts out}$$

where L is the laser optical length in cm, and X/H the ratio of flow length to channel height.

TYPICAL DEVICE CHARACTERISTICS

Since it is assumed we desire to double the temperature of the flowing gas, we desire to stay below $M \approx 0.2$ in the channel for reasons of thermal choking and non-linear gas density gradients (i.e., optical non-uniformity minimization). Hence for a subsonic flow, the requirement of $\tau_t/\tau_f \leq 1/10$ is
$<n>M^2 L \geq 2$ ATM-CM or $<n>L \geq 50$ ATM-CM Typical device characteristics are tabulated below

| L | X/H | P | $<n>$ |
|---|---|---|---|
| 200 cm | 3 | $3 \times 10^5$ Watts Out | 0.2 ATM |
|  | 10 | $1 \times 10^5$ Watts Out | 0.2 ATM |

Since laser mirror technology is safe at approximately $10^4$ w/$cm^2$, we get the corresponding relations for the above 200 cm cavity:

$$\frac{P}{XH} = 10^4 \quad \text{(Mirror Technology)}$$

$$P = \frac{8 \times 10^5}{X/H} \quad \text{(Laser Cavity Scaling)}$$

| X/H | XH | X | H |
|---|---|---|---|
| 3 | 30 $cm^2$ | 10 cm | 3 cm |
| 10 | 10 $cm^2$ | 10 cm | 1 cm |

For electric discharge $N_2/CO_2$ laser devices, an optimum electric field exists at = 5 kV/atm-cm which gives us an operating voltage of approximately $$V = \frac{E}{P} \cdot P \cdot X = 5 \frac{kV}{\text{Atm-CM}} \cdot \frac{2}{10} \text{Atm} \cdot 10 \text{ CM} = 10 \text{ kV}$$

For electric discharge $N_2/CO_2$ laser devices an optimum fractional ionization (ne/P) exists within a factor of 3 of $\sim 10^{12}$ electrons/cc-AMAGAT which corresponds to an operating current density (high side) of 0.6 amp/$cm^2$ at the 0.2 atm conditions analyzed here. Hence the above-outlined device requires a total input current of I=J L H=0.6 Amp/$cm^2 \times 200$ cm$\times$H (cm)

Total voltage and current characteristics of the device are therefore

| X/H | H | I | V | $^{90}$In |
|---|---|---|---|---|
| 3 | 3 cm | 360 Amp | $10^4$ Volts | $3.6 \times 10^6$ Watts In |
| 10 | 1 cm | 120 Amp | $10^4$ Volts | $1.2 \times 10^5$ Watts In |

Comparing these input powers to the computed output powers, we see an approximately 10% efficient device, at a power level greatly exceeding the 10's of kW output power levels demonstrated to date.

The turbulent diffusion stabilized device, while not as easily scalable as volumetrically stabilized techniques, does appear to have upper power levels substantially higher than laminar-diffusion wall-stabilized devices. Medium homogeneity limits due to turbulence may lower this upper power limit.

SUMMARY OF THE INVENTION

In summary, this invention uses turbulent ambipolar diffusion to achieve a relatively high power output from a CW gas flow laser. Turbulence is created by means of a turbulence generator inserted in the flow path of the gas upstream of the working region of the laser.

THE DRAWINGS

DESCRIPTION OF THE ILLUSTRATIVE EMBODIMENT

Figure 1:
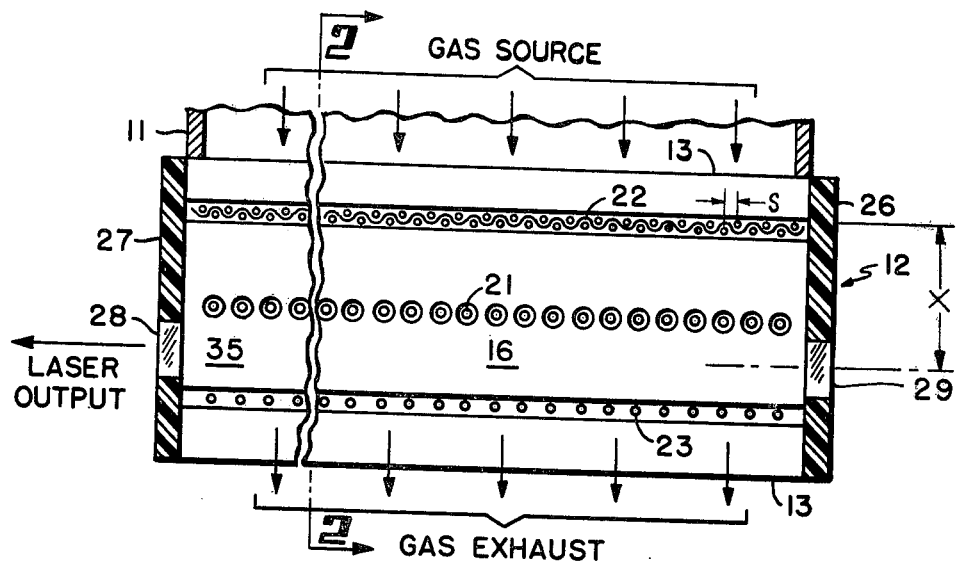
FIG. 1 is a cross-sectional view showing an illustrative embodiment of this invention.
Figure 2:
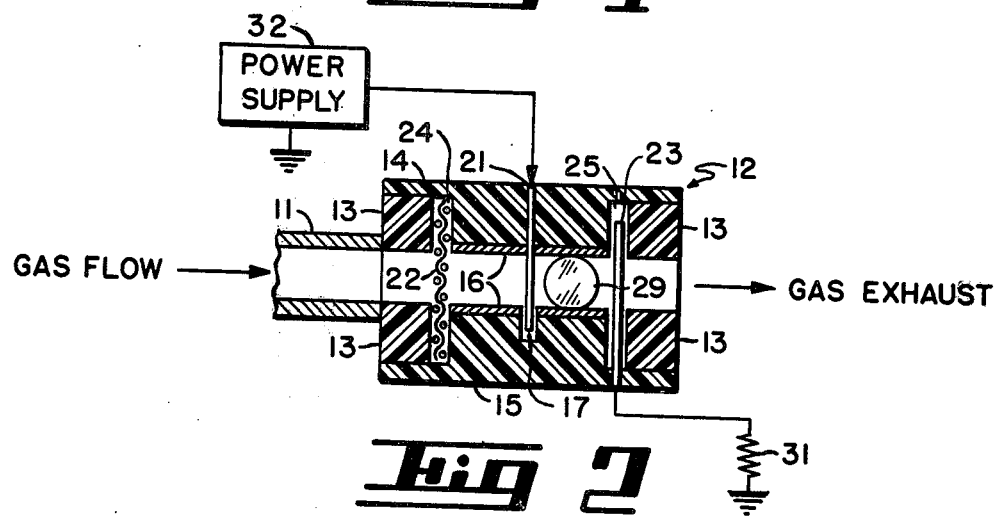
FIG. 2 is a section taken through the line 2—2 in FIG. 1.
Figure 3:
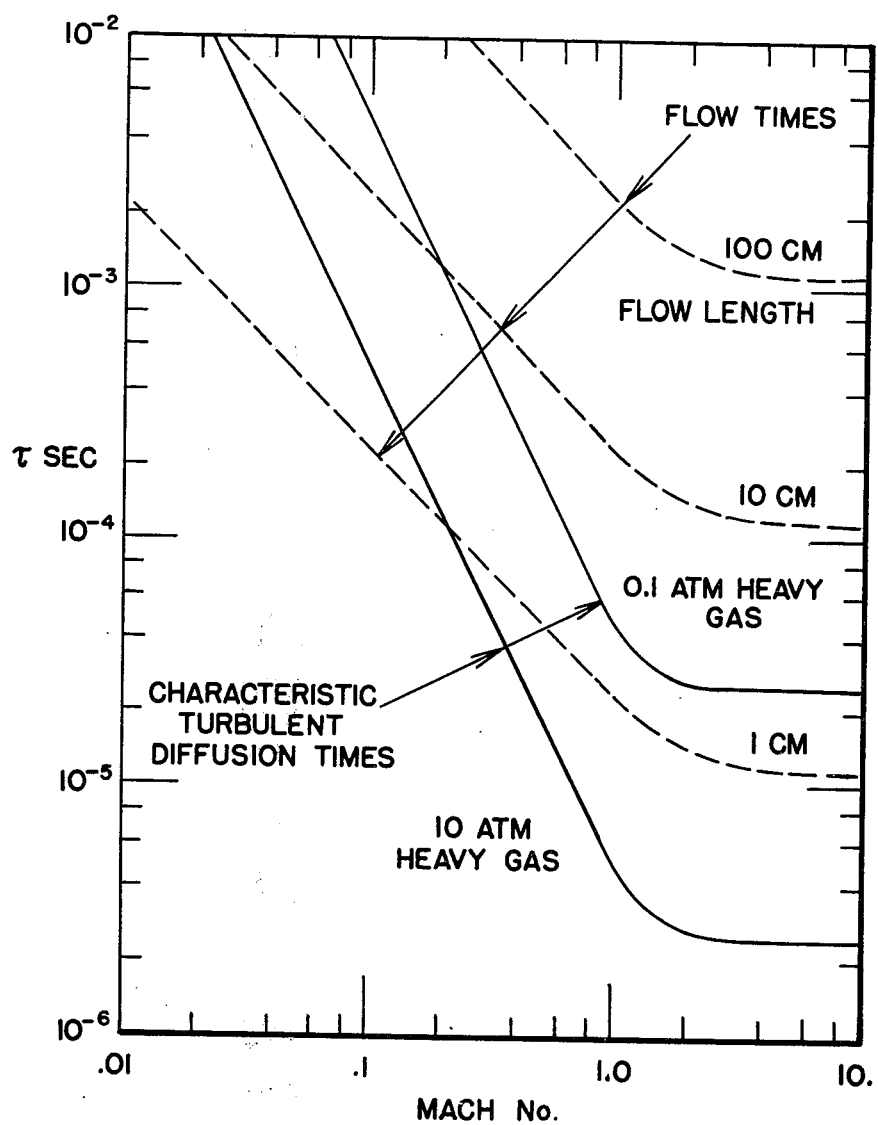
FIG. 3 is a group of curves showing the characteristic flow and turbulent diffusion times.

In FIGS. 1 and 2 a gaseous medium capable of producing lasing action is supplied from a suitable source such as a plenum chamber and diffuser (not shown) through a gas inlet 11 to the working section 12 of a laser. The illustrated laser is very similar to the laser described in Reilly U.S. Pat. No. 3,721,915, but modified by the inclusion of a turbulence generator in accordance with this invention. A typical mixture (for $CO_2$ lasers) may be for example $He/N_2/CO_2 = 3/2/1$.

The working section 12 of the laser is a generally rectangular channel and comprises a frame 13 which supports oppositely disposed top and bottom wall sections 14 and 15. The working section of the channel is comprised preferably of an electrically nonconductive material such as lucite, malamine or fiberglass-epoxy with the inner surfaces lined with a suitable nonablative and electrically nonconductive material 16 such as quartz. The top and bottom sections 14 and 15 are removable from the frame 13 in order to facilitate operation and repair.

The wall sections 14 and 15 are formed to support a plurality of anode electrodes 21, common cathode electrodes 23 and a turbulence generator 22. The anodes 21 are sealably supported in the center portion of the top wall section 14 and extend into the working section between the walls 14 and 15 with the free ends recessed below the inner surface 16 in a groove 17 in the bottom wall section 15. The cathodes 23 are sealably supported in the bottom wall 15 and extend through the working section into a groove 25 defined by the frame 13 and the top wall section 14. The anode and cathode electrodes 21 and 23 are recessed in order to insure uniform discharge in the active flowing gas medium by preventing arcing from the tips of the electrodes.

The turbulence generator 22 is similarly supported in the bottom wall section 15 and extends across the working section in the flow path of the gases and is recessed into the groove 24. The turbulence generator may comprise any number of configurations. As shown in the embodiments of FIGS. 1 and 2, the turbulence generator is a screen. It may also comprise a set of vortex producing blades, vanes or other turbulence generating structures.

Mirrors 28 and 29, which define an optical resonant cavity or lasing region 35 between the anode electrodes 21 and the cathode electrodes 23, are disposed in end walls 26 and 27 of the frame 13 downstream of the turbulence generator 22. The end walls 26 and 27 define flow entrance and exit planes, respectively. The lasing region 35 is not limited to any one specific location and may include a quite large region downstream of the electrodes 21. The mirrors 28 and 29 are conventional in configuration suitable for defining an optical resonant cavity. All of the cathode electrodes 23 are connected to ground through an isolation element, in this case a resistor 31. The anodes 21 are each connected to a grounded direct voltage power supply 32. The population inversion results from the excitation of the flowing gases between the electrodes 21 and 23. Hoag U.S. Pat. No. 3,758,874 shows a screen for altering the flow through a laser, but Hoag uses a screen for assisting in the removal of turbulence rather than for generating turbulence. As known in the literature on flows through screens the flow immediately downstream of a "smoothing screen" is not smooth, but is turbulent. Only after a certain distance behind the screen does smoothing begin, and where it is "completed" depends on one's definition of the word "completed." Screens are characterized typically by a "mesh size." The distance between the center of the perpendicular wires (See FIG. 1) will be called s which is the inverse of mesh size. For example, a 200 mesh screen has 200 wires per inch in the vertical and horizontal direction. Distance downstream of the screen is characterized by x. Distance x is shown in FIG. 1 as the spacing between screen 22 and the center of mirror 29. The mean flow velocity upstream and/or downstream of the screen is called U. The fluctuating component of the flow velocity in the U direction is called u'. Fluctuating velocity components in the other two directions are called v' and w'. Referring to FIG. 1, where mesh size is shown as giving an S=0.1 in., it is found that for a distance downstream of the screen equal to approximately 10 times s (x≦10s) wild disorder is experienced in the magnitude of the fluctuating velocity components u', v' and w'. In addition, the physical scale size of the turbulent eddies are not defined. By the time the flow has moved further than this distance (x>10s) the turbulence begins to smooth down such that eventually u'=v'=w', and a smooth distribution of scale sizes establishes itself, with the maximum eddy size equal to the distance between mesh wires (s) and a smooth Komolgorov spectrum. Between x=10 s and x=100 s the turbulence decays according to a reasonably well established law:

$$\left(\frac{u'}{U}\right)^2 = \frac{1}{100\,(x/s)}$$

By the time x/s=100, the turbulence has therefore smoothed to u'/U=1%, a small value. Since a laser optical cavity is most sensitive to gas density uniformities $\Delta p/p$, this corresponds to a density uniformity of one part in ten thousand ($1/10^4$). This is an excellent medium homogeneity level for atmospheric pressure lasers, up to many meters of optical path length (on the order of 10 to 20 meters) for our present 3/2/1 gas mixture.

Beyond x/s=100, the decay in turbulence intensity is even faster than that indicated above.

Hoag's choice of a smoothing screen was one in which he chose the mesh size to give an s such that at his flow velocity U, the screen was placed sufficiently far upstream of the lasing region that at the x/s of the lasing region his turbulent intensity u'/U was low enough that he judged the turbulence to be not optically degrading.

My choice of a turbulence generator is one which relies on the presence of high turbulence values u'/U in the optical resonant cavity such that rapid ionization and specie transport to the wall occurs, thus permitting stable operation of the discharge in a diffuse mode at higher input power levels, while the density fluctuations $(u'/U)^2$ do not appreciably degrade the optical homogeneity of the medium.

For publications relating to flows through screens, see Moore, F. K., "Theory of Laminar Flows," Vol. IV, High Speed Aerodynamics and Jet Propulsion, Princeton Univ. Press, 1964; Bains and Peterson, "An Investigation of Flow-Thru Screens," Transactions of the ASME 73 (5), pp. 467–480, July 1951; Batchelor, G. K., "The Theory of Homogeneous Turbulence," Students Edition, Cambridge University Press, 1960; Batchelor and Townsend, "Decay of Turbulence in the Final Period," Proc. Roy Soc.A 194, p. 527, (1948); and Uberoi, M. S., "Energy Transfer in Isotropic Turbulence," Phys. Flu. 6, 8, p. 1048, August 1963.

The invention may take forms in addition to those disclosed. For example, the gas flow may be at higher or lower flow rates than the Mach 0.2 case analyzed above and it is believed that the laser will operate successfully with flow velocities to Mach 0.5. Moreover, the turbulence generator need not be a screen or a blade, but may take any form which provides the desired turbulence. In addition, while a D.C. power supply is disclosed, the power supply may also be alternating or pulsating D.C. Further, while in the illustrated embodiment, the electrodes (anode and cathode) are shown extending completely across the flow (i.e., perpendicular to the channel upper and lower walls and perpendicular to the flow velocity vector), the present concept may be applied to discharges where the electrodes are located in or parallel to the channel's upper and lower side walls.

I claim:

1. An improved CW laser apparatus of the type wherein lasing action is produced in a gas flowing at subsonic speed within the walls of a channel, said channel including an optical resonator cavity whose axis is transverse to the direction of flow of said gas, said gas being capable of stimulated emission of coherent radiation when pumped to produce a population inversion between a higher and a lower energy level, said population inversion resulting from excitation of the flowing gases between cathode and anode electrodes disposed across said channel so as to be parallel with the axis of the optical resonator cavity, said optical resonant cavity axis effectively forming the center of the excitation region between said electrodes, wherein the improvement comprises:

a screen extending perpendicularly across said channel upstream of said optical resonator cavity for generating small scale, substantially uniform turbulence across the entire gas flow front within said optical resonator cavity, the perpendicular distance between said screen and the axis of said optical resonator cavity being less than ten times the inverse of the screen mesh size, said turbulence providing both energy and specie diffusion throughout the entire volume of said resonator cavity thereby providing improved operating stability at relatively higher powers.

2. The invention as defined in claim 1 wherein said channel is rectangular in cross section and is defined by spaced top and bottom walls, and by spaced flow entrance and exit planes.

3. The invention as defined in claim 2 wherein the distance between said flow exit and entrance planes is greater than the distance between said top and bottom walls.

4. The invention as defined in claim 1 and including means for energetically pumping said gas, said means comprising a plurality of anodes supported in said channel upstream of said optical cavity and a plurality of cathodes supported in said channel downstream of said cavity and a source of voltage and current connected across said cathodes and anodes, delivering said current and voltage in a direction parallel with the main flow direction.

5. The invention as defined in claim 1 wherein the screen mesh size is such that there are at least ten wires per inch in both the vertical and horizontal directions across the screen.

6. The invention as defined in claim 1 and including an optical resonator cavity of rectangular cross section, said cavity being longer in the flow direction than it is high, thereby allowing transport of species and energy concentrations to the walls of said cavity in a time equal to or shorter than the flow transit time through said cavity.

* * * * *

UNITED STATES PATENT AND TRADEMARK OFFICE
CERTIFICATE OF CORRECTION

PATENT NO. : 4,156,207
DATED : May 22, 1979
INVENTOR(S) : James P. Reilly

It is certified that error appears in the above—identified patent and that said Letters Patent are hereby corrected as shown below:

Column 4, line 8, for "$\tau_\nu \leq \rho/\mu$" read --$\tau_\nu \approx \rho/\mu$--;

and Column 6, line 19, for "$90_{In}$" read --$P_{In}$--.

Signed and Sealed this

Twenty-first Day of August 1979

[SEAL]

Attest:

LUTRELLE F. PARKER

Attesting Officer    Acting Commissioner of Patents and Trademarks